US012626931B2

(12) United States Patent
Mclean et al.

(10) Patent No.: US 12,626,931 B2
(45) Date of Patent: May 12, 2026

(54) SYSTEM AND METHOD FOR RECOVERING CONSTITUENTS FROM BATTERIES

(71) Applicant: ENVIRONMENTAL 360 SOLUTIONS LTD., Aurora (CA)

(72) Inventors: Leslie Mclean, Port Colborne (CA); Vaikuntam I. Lakshmanan, Port Colborne (CA); James Ewles, Port Colborne (CA); Ashish Bhandari, Port Colborne (CA)

(73) Assignee: Environmental 360 Solutions Ltd., Aurora (CA)

( * ) Notice: Subject to any disclaimer, the term of this patent is extended or adjusted under 35 U.S.C. 154(b) by 915 days.

(21) Appl. No.: 17/848,305

(22) Filed: Jun. 23, 2022

(65) Prior Publication Data

US 2022/0416324 A1 Dec. 29, 2022

Related U.S. Application Data

(60) Provisional application No. 63/215,885, filed on Jun. 28, 2021.

(51) Int. Cl.
| | |
|---|---|
| *H01M 6/52* | (2006.01) |
| *C01G 9/06* | (2006.01) |
| *C01G 45/10* | (2006.01) |
| *C05D 9/00* | (2006.01) |
| *C22B 3/00* | (2006.01) |
| *C22B 3/02* | (2006.01) |
| *C22B 3/04* | (2006.01) |
| *C22B 3/22* | (2006.01) |
| *C22B 3/44* | (2006.01) |

(Continued)

(52) U.S. Cl.
CPC ................ *H01M 6/52* (2013.01); *C01G 9/06* (2013.01); *C01G 45/10* (2013.01); *C05D 9/00* (2013.01); *C22B 3/02* (2013.01); *C22B 3/22* (2013.01); *C22B 3/44* (2013.01); *C22B 7/007* (2013.01); *C22B 19/22* (2013.01); *C22B 47/00* (2013.01); *Y02P 10/20* (2015.11); *Y02W 30/84* (2015.05)

(58) Field of Classification Search
None
See application file for complete search history.

(56) References Cited

U.S. PATENT DOCUMENTS

| | | | |
|---|---|---|---|
| 8,586,218 | B1 | 11/2013 | Smith et al. |
| 2011/0123419 | A1 | 5/2011 | Shin et al. |

FOREIGN PATENT DOCUMENTS

| | | |
|---|---|---|
| CN | 111969224 A | 11/2020 |
| CN | 111969225 A | 11/2020 |
| CN | 112201802 A | 1/2021 |

(Continued)

OTHER PUBLICATIONS

Sayligan et al. A review of technologies for the recovery of metals from spent alkaline and zinc carbon batteries. Hydrometallurgy 97 (2009) 158-166 (Year: 2009).*

(Continued)

*Primary Examiner* — Jennifer A Leung

(57) ABSTRACT

An apparatus, method and system are provided to recover constituent components from single use batteries. In particular, the apparatus, method and system may be used to recover zinc and manganese in the form of sulfates from depleted commercial which in turn may be subsequently used for other applications, such as micronutrients and fertilizers.

17 Claims, 3 Drawing Sheets

(51) Int. Cl.
*C22B 7/00* (2006.01)
*C22B 47/00* (2006.01)

(56) References Cited

FOREIGN PATENT DOCUMENTS

| | | | | |
|---|---|---|---|---|
| CN | 112259754 | A | 1/2021 | |
| EP | 1684369 | A1 * | 7/2006 | ............. C22B 7/006 |
| WO | WO-2009028795 | A3 | 3/2009 | |
| WO | WO-2015162902 | A1 * | 10/2015 | ............... B09B 3/35 |

OTHER PUBLICATIONS

Andak et al. Recovery of zinc and manganese from spent zinc-carbon and alkaline battery mixtures via selective leaching and crystallization processes. Journal of Environmental Chemical Engineering 7 (2019) 103372 (Year: 2019).*

Ferella et al. Process for the recycling of alkaline and zinc-carbon spent batteries. Journal of Power Sources 183 (2008) 805-811 (Year: 2008).*

Spanos, Constantine et al. "Life-cycle analysis of flow-assisted nickel zinc-, manganese dioxide-, and valve-regulated lead-acid batteries designed for demand-charge reduction." Renewable and Sustainable Energy Reviews 43 (2015): Abstract.

Chen, Litian, et al. "Manganese monoxide-based materials for advanced batteries." Coordination Chemistry Reviews 368 (2018): Abstract.

Zhu, Zihao, et al. "Facile synthesis of MOF-derived porous spinel zinc manganese oxide/carbon nanorods hybrid materials for supercapacitor application." Ceramics International 44.16 (2018): Abstract.

Yuyang, Li, "On the Harm and Utilization of Waste Chemical Batteries", Yunnan Chemical Technology, Nov. 2018, vol. 45, No. 11.

* cited by examiner

200

SYSTEM AND METHOD FOR RECOVERING CONSTITUENTS FROM BATTERIES

FIELD OF USE

The present specification relates generally to a system and method of recovering constituents from batteries, and more particularly to recovering constituents from spent batteries as part of a recycling process.

BACKGROUND OF THE INVENTION

Single use batteries are used in a wide variety of devices. For example, single use batteries may be used for radios, controllers, toys, flashlights, and other small electronic devices. Single use batteries are generally alkaline batteries having a sealed cell and cannot be recharged with a reverse current. Accordingly, upon depletion of the electric charge, these batteries are simply discarded and often end up in landfill disposal sites.

Some efforts have been made to recover the constituent components of single use batteries. For example, the battery may be disassembled by mechanically removing the outer casing from the battery cell. The components may then be subjected to a chemical process to separate the remaining constituent solid components of the battery cell. In the case of a single use alkaline batteries, the major constituent solid components of the battery cells are carbon, zinc, potassium, manganese, iron and other compounds.

BRIEF SUMMARY OF THE INVENTION

In accordance with an aspect of the invention, an apparatus, method and system are provided to recover constituent components from single use batteries. In particular, the zinc and the manganese may be recovered in the form of sulfates to be subsequently used for other purposes, such as micronutrients and fertilizers.

In particular, the claimed apparatus, method and system utilize a first leach chamber to treat a slurry with a first acid and a first oxidizing agent to form a first solution including first metal ions and second metal ions; a precipitation reactor to receive the first solution from the first leach chamber, wherein the first solution is to be reacted with a first metal oxide and a second oxidizing agent to form a precipitate, wherein the precipitate is to be separated from a portion of the first metal ions remaining dissolved; a first crystallization chamber to crystallize the portion of the first metal ions for collection; a second leach chamber to receive the slurry after treatment by the first leach chamber and the precipitate, wherein the second leach chamber is to treat the precipitate with a second acid and a third oxidizing agent to form a second solution including the first metal ions and the second metal ions; a cementation chamber to receive the second solution from the second leach chamber, wherein the second solution is to be reacted with a reducing agent to form a first metal, wherein the first metal is to be delivered to the first leach chamber; and a second crystallization chamber to crystallize the second metal ions in the second solution for collection.

Additional features such as a grinder with or without a magnetic separator, dehydration reactors, one or more separators and/or air vents or scrubbers, may be added to the apparatus, method and system as described.

BRIEF DESCRIPTION OF THE DRAWINGS

Reference will now be made, by way of example only, to the accompanying drawings in which.

DETAILED DESCRIPTION OF THE INVENTION

Although many different types of batteries are used for electronic devices, many devices continue to use primary batteries. For example, a common type of primary battery is an alkaline battery that generates power from the reaction of zinc metal and manganese dioxide. In particular, an alkaline battery cell includes an anode, which generally includes a dispersion of zinc powder in a gel containing a potassium hydroxide electrolyte. This anode is surrounded by a separator which may be a non-woven layer of cellulose (paper) or a synthetic polymer (plastic). Surrounding the separator is a cathode which is generally a compressed paste of manganese dioxide with carbon powder, such as graphite, to increase conductivity within the cell. The anode, separator, and cathode are sealed in a casing, which is normally a ferrous based casing. In addition, the primary batteries typically include other constituents to reduce the negative effects of impurities within the battery.

After the primary battery is depleted of power, the batteries are generally discarded. In some instances, the components are recycled and reused; however, the recycling of the batteries is typically not carried out due to the high cost of the process compared with the value of the materials that may be recovered. In addition, conventional chemical processes used to recover constituents from the battery may generate effluent waste streams during the chemical separation processes that may lead to environmental issues.

An apparatus, method, and system are provided to recover constituent components from single use batteries. In particular, the zinc and the manganese may be recovered in the form of sulfates to be subsequently used for other applications, such as micronutrients and fertilizers.

Figure 1:
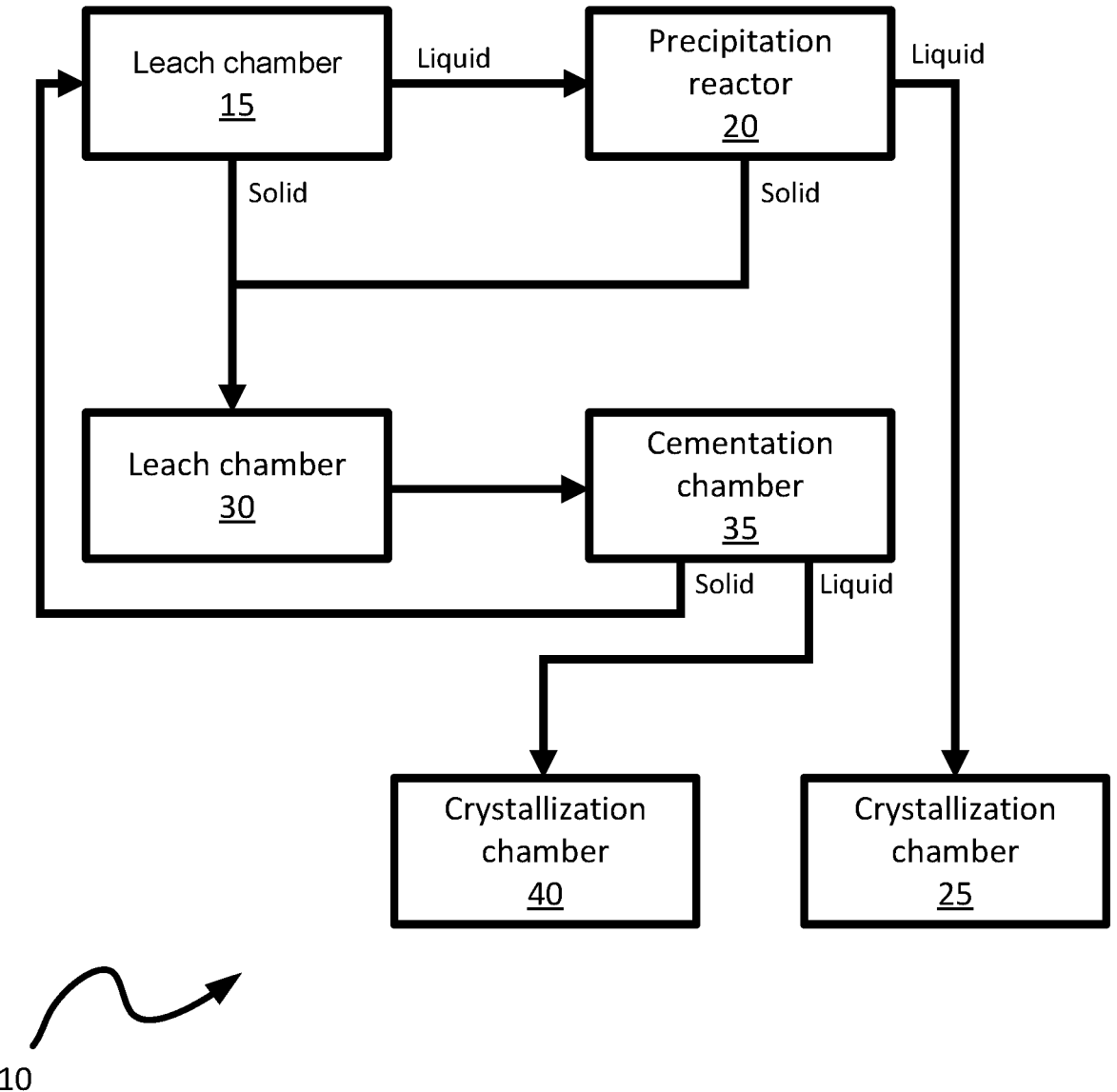
FIG. 1 is a schematic representation of an example apparatus to recover metal constituents from a battery.

Referring to FIG. 1, a schematic representation of an example apparatus to recover metal constituents from a battery is generally shown at 10. The apparatus 10 may include additional components to handle batteries, such as for carrying out various pre-processing steps. Furthermore, the apparatus may include post processing components to handle waste from the process of recovering or reclaiming constituents. In the present example, the apparatus 10 includes a first and a second leach chambers 15 and 30, a precipitation reactor 20, a cementation chamber 35 and a first and a second crystallization chamber 25 and 40.

In the present example, the first leach chamber 15 is used to treat a slurry with an acid and an oxidizing agent. It is to be appreciated by a person of skill in the art with the benefit of this description that the specific acid and oxidizing agent to be used is not particularly limited. The selection of the acid and the oxidizing agent may be dependent on the chemical composition of the material in the slurry. For example, if the slurry were to be formed by grinding a battery into the slurry, the slurry may include ground anode and cathode components. In the present example, the anode includes a metal constituent and the cathode includes another metal constituent which may be in the form of a metal oxide. Accordingly, by treating the slurry and the components in the slurry, metal may leach out from the anode materials and the cathode materials in the form of ions dissolved in a solution. It is to be understood that not all of the slurry would be soluble. Accordingly, the non-soluble portions of the slurry would be separated from the solution. The solid components remaining after the treatment with the acid and oxidizing agent are to be transported to the second leach chamber 30 whereas the solution including the metal ions is to be transported to the precipitation reactor 20.

The precipitation reactor 20 is used to receive the solution from the first leach chamber 15 for additional processing. In the present example, the solution received from the first leach chamber 15 is reacted with a metal oxide and a strong oxidizing agent to form a precipitate with some of the ions present in the solution. Accordingly, the formation of the precipitate removes the targeted ions from the solution allowing for subsequent separation. Therefore, it is to be appreciated that some of the solution may be processed to remove some metal ions and leave other metal ions remaining in the solution. Furthermore, the process may involve a chemical reaction that may precipitate substantially all metal ions of a specific type and a small portion of metal ions that are intended to remain in the solution. Accordingly, in a solution with two or more types of metal ions, such as zinc and manganese, a reaction to precipitate the manganese ions out of the solution while leaving the majority of the zinc ions dissolved in the solution is used.

Accordingly, once the precipitate is formed in the precipitation reactor 20, the solid precipitate is to be separated from the solution. In the present example, the solid precipitate is to be transferred to the second leach chamber 30 to be combined with the solid remaining after the leaching process carried out in the first leach chamber 15. The solution from the precipitation reactor 20 is transferred to the first crystallization chamber 25 where the metal ions remaining in the solution are crystalized. Once crystallized into a solid form, such as a sulfate, the solid may be collected in a relatively pure form to be repurposed. Continuing with the example above, the first crystallization chamber 25 may receive a solution with zinc ions dissolved in the solution. The first crystallization chamber 25 causes a zinc sulfate hydrate to form which may be collected to be used as fertilizer.

The second leach chamber 30 is used to treat a solid with an acid and an oxidizing agent. In the present example, the second leach chamber 30 is to receive solids from the slurry treated by the first leach chamber 15 and solids precipitated from the precipitation reactor 20.

It is to be appreciated by a person of skill in the art with the benefit of this description that the specific acid and oxidizing agent to be used is not particularly limited. For example, the second leach chamber 30 may use the same acid or oxidizing agent as the first leach chamber 15. However, in other examples, a different acid and/or a different oxidizing agent may be used. The selection of the acid and the oxidizing agent may be dependent on the chemical composition of the material in the slurry. For example, the solids may be treated to leach out further materials to form a solution of metal ions. It is to be understood that not all of the solids may be soluble. Accordingly, the non-soluble portions are to be separated from the solution and either reprocessed or discarded as non-recoverable or unwanted constituents of the battery. The solution including the metal ions is to be transported to the cementation chamber 35.

The cementation chamber 35 is used to receive the solution from the second leach chamber 30 for additional processing. In the present example, the solution received from the second leach chamber 30 is reacted with a reducing agent, such as a metal powder, to recover the more electropositive metals from the solution. Continuing with the example above, in the situation where both zinc and manganese ions are present in the solution, the cementation process reduces the more electropositive ion, zinc in this case, to zinc metal. The solid metal formed from the cementation process is separated and delivered back to the first leach chamber 15 to be re-processed with slurry. Furthermore, if the reducing agent is selected to be a metal powder of the ion that is the less electropositive ion in the solution, for instance according to this example manganese powder, no further types of metal and ions would be introduced that are to be subsequently removed.

The solution from the cementation chamber 35 is transferred to the second crystallization chamber 40 where the remaining metal ions in the solution are crystalized. Once crystallized into a solid form such as a sulfate, the solid may be collected in a relatively pure form to be repurposed. Continuing with the example above, the second crystallization chamber 40 may receive a solution with manganese ions dissolve in the solution. The second crystallization chamber 40 may cause manganese sulfate hydrate to form which may be collected to be used for other purposes, such as micronutrient and fertilizer.

It is to be appreciated that this apparatus 10 may be used to carry out a continuous process wherein slurry is received at the first leach chamber 15 while crystalized constituents are removed as they are crystalized. Therefore, the recycling process may be carried out without stopping the apparatus 10 to reload slurry or other feed material.

Figure 2:
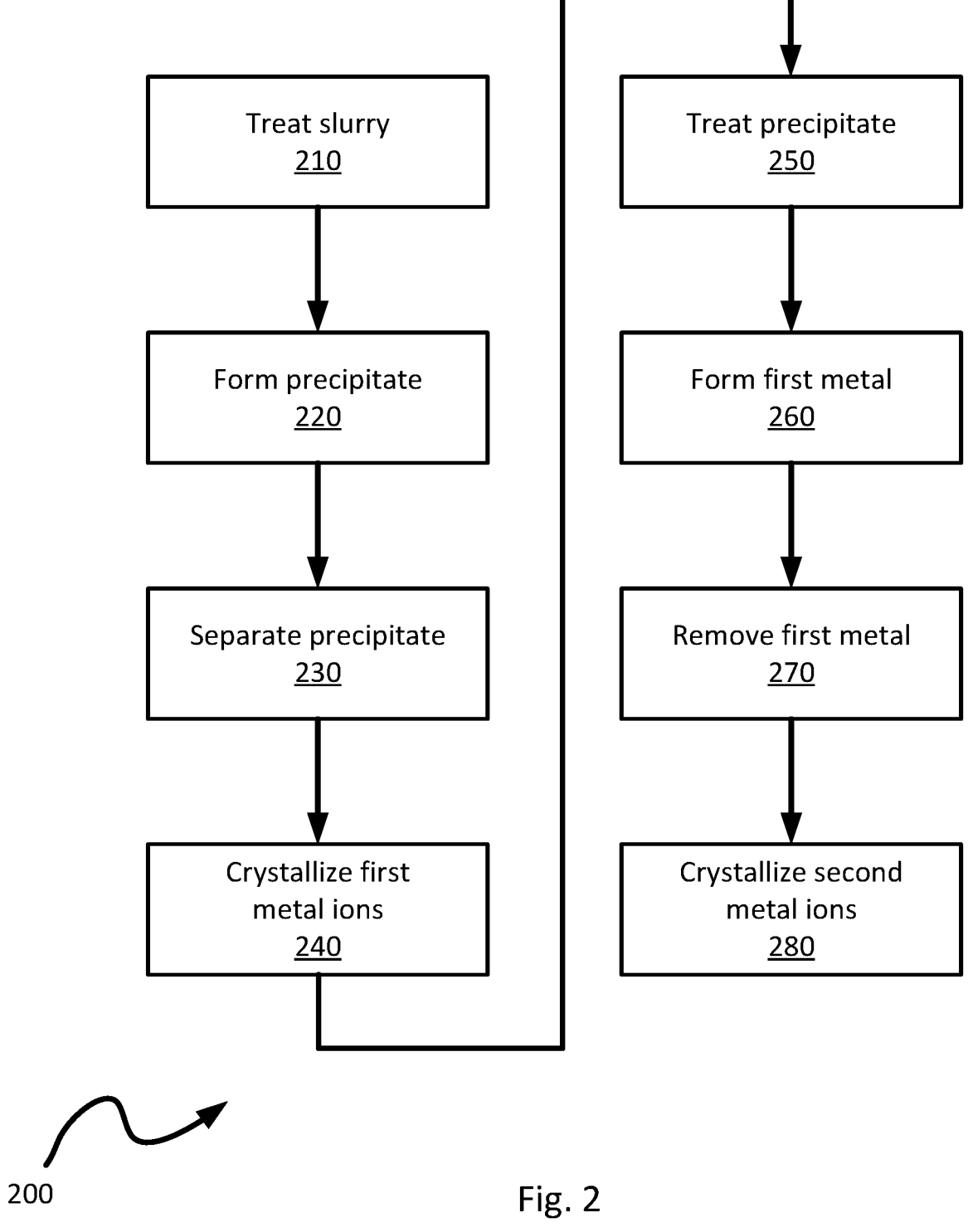
FIG. 2 is a flowchart of an example method of recover metal constituents from a battery.

Referring to FIG. 2, a flowchart of an example method to recover metal constituents from a battery is generally shown at 200. In order to assist in the explanation of this example method 200, it is assumed that described method 200 may be performed with the apparatus 10. Indeed, the method 200 may be one way in which apparatus 10 may be configured.

Furthermore, the following discussion of method 200 may lead to a further understanding of the apparatus 10 and its various parts and the chemical reactions carried out by the apparatus 10. In addition, it is to be emphasized that the example method 200 may not be performed in the exact sequence as shown, and various blocks may be performed in parallel rather than in sequence, or in a different sequence altogether.

Block 210 comprises treating a slurry with an acid and oxidizing agent to leach constituents out of the slurry. Accordingly, the process provides a solution having metal ions from the slurry dissolved therein. In the present example where the slurry is a combination of anode and cathode material from a battery, the solution may include two different types of metal ions, one type from the anode and another type from a cathode.

The solution formed at block 210 is then further reacted to form a precipitate at block 220. In the present example, the solution from block 210 is reacted with a metal oxide and a strong oxidizer to form the precipitate. The precipitate removes substantially all of one type of metal ions, such as the metal ions from the cathode, from the solution and leave a portion of the other type of metal ions, such as the metal ions from the anode, in the solution.

In block 230, the precipitate may be separated from the solution using a liquid solid separator. Continuing with the example, since the metal ions from the cathode are substantially removed from the solution as a precipitate, the remaining ions in the solution are of the type from the anode, which may be crystallized to form a metal sulfate for collection at block 240.

The precipitate formed at block 220 may be treated at block 250 with an acid and an oxidizing agent to provide another solution primarily with components of the precipitate. However, it is to be appreciated that the treatment of the precipitate may also provide a solution having metal ions from both the anode and the cathode. Since a substantial amount of metal ions from the anode were crystallized in block 240, fewer metal ions would be in the solution generated at block 250.

The solution from the process at block 250 is used in a reaction, such as a cementation process, to form metal from the anode at block 260. The metal may subsequently be separated from the solution and removed at block 270. The remaining ions in the solution are of the type from the cathode which may be crystallized to form a metal sulfate for collection at block 280.

Accordingly, it is to be appreciated by a person of skill with the benefit of this description that the method 200 starts with a slurry or mixture of anode and cathode battery parts. The method may then be carried out to generate two different metal sulfates which may be collected at blocks 240 and 280 for use in other applications. In the example of an alkaline battery with a zinc anode and a cathode having manganese dioxide, the method 200 may be used to collect zinc sulfate hydrate at block 240 and manganese sulfate hydrate at block 280.

Figure 3:
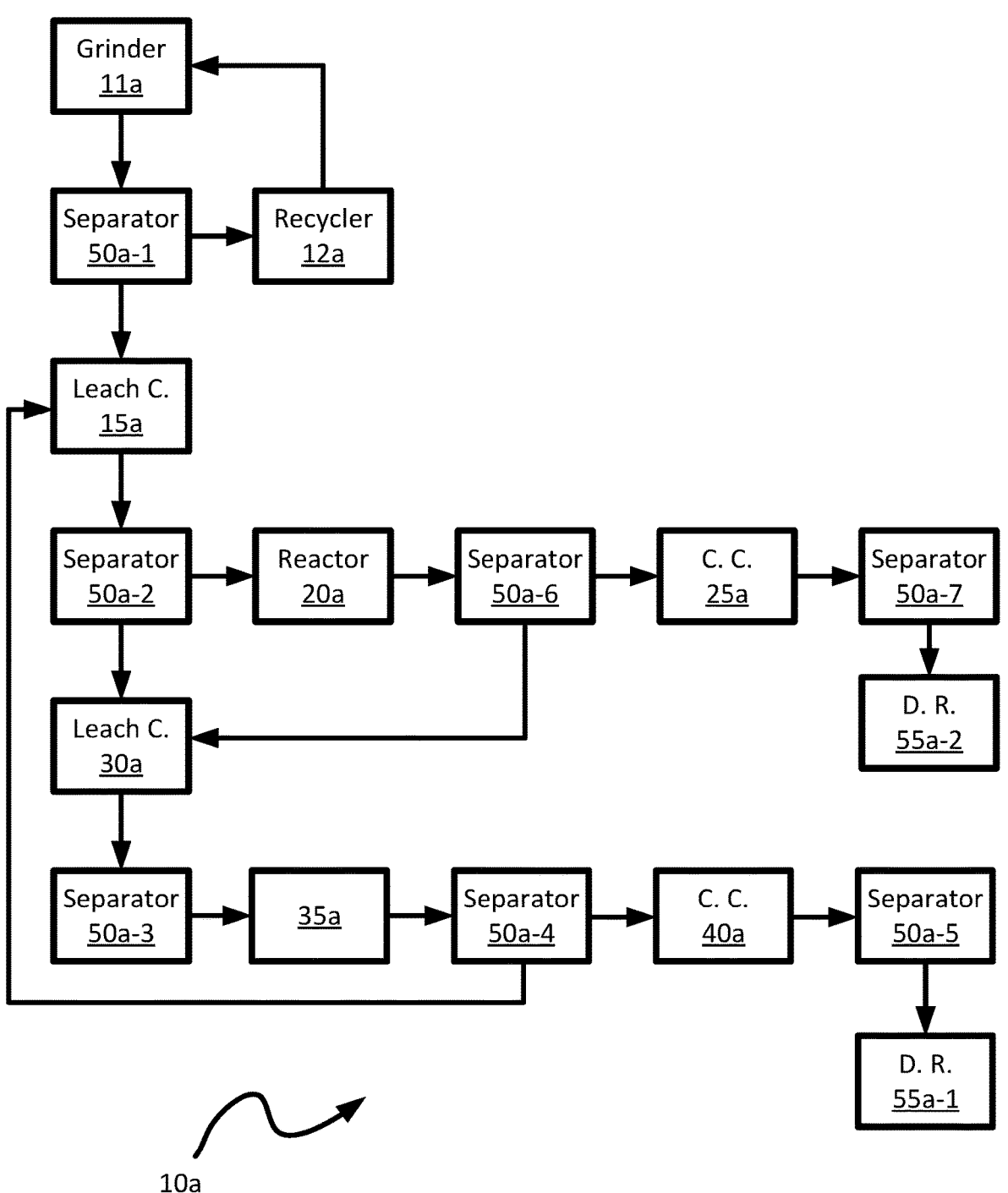
FIG. 3 is an example of a system to recover metal constituents from a battery.

Referring to FIG. 3, another example of a system to recover metal constituents from a battery, according to the claimed invention, is presented at 10a. Like components of the system 10a bear like reference numerals to their counterparts in the apparatus 10, except followed by the suffix "a". The system 10a includes a grinder 11a, a recycler 12a, a first and a second leach chamber 15a and 30a, a precipitation reactor 20a, a cementation chamber 35a, a first and a second crystallization chamber 25a and 40a, separators 50a-1, 50a-2, 50a-3, 50a-4, 50a-5, 50a-6, and 50a-7 (generically, these separators are referred to herein as "separator 50a" and collectively they are referred to as "separators 50a"), and dehydration reactors 55a-1 and 55a-2 (generically, these dehydration reactors are referred to herein as "dehydration reactor 55a" and collectively they are referred to as "dehydration reactors 55a").

In the present example, the grinder 11a is a mechanical component to receive zinc-based batteries (the cathode comprises zinc) and to grind the batteries to provide a slurry. In the present example, the whole battery may be added to the grinder. In other examples, the battery may be preprocessed, such as mechanically opened and separated. The components of the battery may vary; however, in some examples, the battery may include potassium hydroxide, water, zinc and zinc oxides, zinc chloride, zinc carbon, manganese and manganese oxides, and some iron particles.

During the grinding process, water may be added to and removed from the grinder 11a to remove the potassium hydroxide originally from the electrolyte of the battery since potassium hydroxide is soluble in water. In some examples, the water may be flowed through the slurry to dissolve the potassium hydroxide. It is to be appreciated that potassium hydroxide may be collected in the waste water. Alternatively, potassium hydroxide may be discarded.

In the present example, approximately 66% of the potassium hydroxide may be removed by grinding the battery components in water to solid ratio by weight of 1.5:1 for about 30 minutes at approximately 25° C. The particle size of the slurry generated by the grinder is not limited and may have a 75 μm pass rate of about 59% to about 84%. The grinder 11a may also include a magnetic separator to remove iron or steel particles to be discarded.

The separators 50a are used to separate a liquid from a solid. It is to be appreciated that the separators 50a are not particularly limited. For example, the separators 50a may use a gravity trap, a filtering system, or any other mechanism capable of separating a solid from a liquid. The separator 50a-1 is to separate the solid and liquid components of the slurry. The liquid portion of the slurry includes the potassium hydroxide. The solid portion of the slurry is sent to the recycler 12a where the water component may be separated from the potassium hydroxide portion to be reintroduced to the grinder 11a. Accordingly, by recycling the water, less water will be consumed to carry out the recycling process to reduce the operating costs of the system 10a.

The first leach chamber 15a is used to treat the slurry with a mixture of water, concentrated sulfuric acid and oxygen. It is to be appreciated that the reagents are not particularly limited and that the some may be substituted with variants. For example, the concentrated sulfuric acid may be substituted with another suitable acid such as, but not limited to, nitric acid ($HNO_3$) to make zinc $Zn(NO_3)_2$ and manganese nitrate $Mn(NO_3)_2$ and their respective hexahydrates, i.e. $Zn(NO_3)_2(H_2O)_6$ and $Mn(NO_3)_2(H_2O)_6$, hydrochloric acid (HCl) to make zinc ($ZnCl_2$) and manganese chloride ($MnCl_2$) and their respective hydrates, i.e. $(ZnCl_2)(H_2O)_6$ and $(MnCl_2)(H_2O)_6$, phosphoric acid ($H_3PO_4$) to make zinc ($Zn_3(PO_4)_2$ and manganese phosphate ($Mn_3(PO_4)_2$ and their respective dihydrates, i.e. $(Zn_3(PO_4)_2)(H2O)_4$ and $(Mn_3(PO_4)_2)(H2O)_4$, acetic acid ($CH_3CO_2)_2$ to make zinc ($Zn(CH_3CO_2)_2$) and manganese acetate ($Mn(CH_3CO_2)_2$) and their respective hydrates i.e. $(Zn(CH_3CO_2)_2(H_2O)_2$ and $(Mn(CH_3CO_2)_2(H_2O)_2$, as well as any other viable acids Similarly, oxygen may be substituted with another oxidizing agent, such as, but not limited to, sulfur dioxide, in other examples. In the present example, the ratio of water to acid to oxidizing agent is about 11.2:5.1:1 and the mixture is combined and stirred in the first leach chamber 15a for about four hours at 55° C. However, in other examples, the ratio and conditions may be varied or modified. The resulting slurry is then sent to the separator 50a-2 where the liquid portion is to be separated and transferred to the precipitation reactor 20a and the solid portion is sent to the second leach chamber 30a. Furthermore, any gases generated in the leach process is to be vented to atmosphere either directly or through a scrubber to remove any harmful gases from the leach process.

The second leach chamber 30a is used to treat the solid received from the first leach chamber 15a with a mixture of water, concentrated sulfuric acid, and sulfur dioxide to form another slurry. It is to be appreciated that the reagents are not particularly limited and that the some may be substituted with variants. For example, the concentrated sulfuric acid may be substituted with another suitable acid such as, but not limited to, nitric acid ($HNO_3$) to make zinc $Zn(NO_3)_2$ and manganese nitrate $Mn(NO_3)_2$ and their respective hexahydrates, i.e. $Zn(NO_3)_2(H_2O)_6$ and $Mn(NO_3)_2(H_2O)_6$, hydrochloric acid (HCl) to make zinc ($ZnCl_2$) and manganese chloride ($MnCl_2$) and their respective hydrates, i.e. $(ZnCl_2)(H_2O)_6$ and $(MnCl_2)(H_2O)_6$, phosphoric acid ($H_3PO_4$) to make zinc ($Zn_3(PO_4)_2$ and manganese phosphate ($Mn_3(PO_4)_2$ and their respective dihydrates, i.e. $(Zn_3(PO_4)_2)(H2O)_4$ and $(Mn_3(PO_4)_2)(H2O)_4$, acetic acid ($CH_3CO_2)_2$ to make zinc ($Zn(CH_3CO_2)_2$) and manganese acetate ($Mn(CH_3CO_2)_2$) and their respective hydrates i.e. $(Zn(CH_3CO_2)_2(H_2O)_2$ and $(Mn(CH_3CO_2)_2(H_2O)_2$, as well as any other viable acids. Similarly, sulfur dioxide may be substituted with another oxidizing agent, such as oxygen or ozone, in other examples. In the present example, the ratio of water to acid to oxidizing agent is about 23:18:1 and the mixture is combined and stirred in the second leach chamber 30a for about four hours at 75° C. However, in other examples, the ratio and conditions may be varied or modified. The resulting slurry is then sent to the separator 50a-3 where the liquid portion, which may include some zinc ions and manganese ions, is separated and transferred to the cementation chamber 35a and the solid portion, which may include zinc oxide, manganese compounds and graphite, is discarded. Furthermore, any gases generated in the leach process are to be vented to atmosphere either directly or through a scrubber to remove any harmful gases from the leach process.

The cementation chamber 35a is used to treat the liquid received from the second leach chamber 30a with a reducing agent, such as manganese powder, to form zinc metal and a liquid having manganese ions. Accordingly, any zinc ions received in from the second leach chamber 30a are removed from the solution via a cementation process. In the present example, the ratio of reducing agent to liquid received from the second leach chamber 30a is about 1:42 and the mixture is combined and stirred in the cementation chamber 35a for about four hours at 25° C. In other examples, the ratio and conditions may be varied or modified. The resulting mixture is then sent to the separator 50a-4 wherein the liquid portion, which includes manganese ions, is separated and transferred to the second crystallization chamber 40a and the solid portion, which may include zinc metal, is transferred back to the first leach chamber 15a to be re-processed to recover the zinc.

In the second crystallization chamber 40a, manganese sulfate polyhydrate (in some instances manganese sulfate hydrate) is formed by heating the solution received from the cementation chamber 35a. The manner by which the solution is heated is not particularly limited. In the present example, the solution is heated with steam to about 103° C. The gases generated in the second crystallization chamber 40a may be primarily steam and may be removed and vented to atmosphere. Alternatively, the gases may be captured, condensed and recycled in the process, such as back to the second leach chamber 30a. The mixture of manganese sulfate and liquid may be separated by separator 50a-5. The solid portion, which is substantially pure manganese sulfate hydrate, is transferred to the dehydration reactor 55a-1. The liquid portion is returned to the second crystallization chamber 40a to continue crystallizing any remaining manganese ions in the liquid.

The dehydration reactors 55a are not particularly limited and are to remove moisture from the crystallized sulfates prior to collection. In particular, the dehydration reactors 55a are used to drive off some of the parts of water of hydration to provide a lower polyhydrate, such as but not limited to, monohydrate sulfate as a final product to be collected. For example, the dehydration reactor 55a-1 may maintain the manganese sulfate heptahydrate at a temperature of about 90° C. for about 3 hours to remove six parts of water to provide manganese sulfate monohydrate which is a final product to be collected from the system 10a. Furthermore, any gases generated in the dehydration process are to be vented to atmosphere either directly or through a scrubber to remove any harmful components from the dehydration process.

The precipitation reactor 20a is used to treat the liquid received from the first leach chamber 15a with zinc oxide powder and an oxidizing agent, such as ozone, to form manganese dioxide and a liquid having zinc ions. Accordingly, any manganese ions received in from the first leach chamber 15a are removed from the solution via the reaction as manganese dioxide precipitate. It is to be appreciated that the process may also precipitate some of the zinc ions in the solution which may be subsequently recovered by the cementation chamber 35a. In the present example, the ratio of zinc powder to ozone by weight is about 6.9:1 and the mixture is combined in the precipitation reactor 20a. The resulting mixture is then sent to the separator 50a-6 where the liquid portion, which includes zinc ions, is separated and thereafter transferred to the first crystallization chamber 25a and the solid portion is transferred to the second leach chamber 30a to recover the manganese.

In the first crystallization chamber 25a, zinc sulfate heptahydrate is formed by heating the solution received from the precipitation reactor 20a. The manner by which the solution is heated is not particularly limited. In the present example, the solution is to be heated with steam to about 103° C. The gases generated in the first crystallization chamber 25a may be primarily steam and may be removed and vented to atmosphere. Alternatively, the gases may be captured, condensed and recycled in the process, such as back to the first leach chamber 15a. The mixture of zinc sulfate and liquid may be separated using separator 50a-7. The solid portion, which is substantially pure zinc sulfate hydrate, is transferred to the dehydration reactor 55a-2. The liquid portion is returned to the first crystallization chamber 25a to continue crystallizing any remaining zinc ions in the liquid.

The dehydration reactor 55a-2 may maintain the zinc sulfate heptahydrate at a temperature of about 90° C. for about 3 hours to remove six parts of water to provide zinc sulfate monohydrate which is another final product to be collected from the system 10a. Furthermore, any gases generated in the dehydration process are to be vented to atmosphere either directly or through a scrubber to remove any harmful components from the dehydration process.

While specific embodiments have been described and illustrated, such embodiments should be considered illustrative only and should not serve to limit the accompanying claims.

What is claimed is:

1. An apparatus comprising:
a first leach chamber to treat a slurry with a first acid and a first oxidizing agent to form a first solution including first metal ions and second metal ions;
a precipitation reactor to receive the first solution from the first leach chamber, wherein the first solution is to be reacted with a first metal oxide and ozone to form a precipitate, wherein the precipitate is to be separated from a portion of the first metal ions remaining dissolved;
a first crystallization chamber to crystallize the portion of the first metal ions for collection;
a second leach chamber to receive the slurry after treatment by the first leach chamber and the precipitate, wherein the second leach chamber is to treat the precipitate with a second acid and a second oxidizing agent to form a second solution including the first metal ions and the second metal ions;
a cementation chamber to receive the second solution from the second leach chamber, wherein the second solution is to be reacted with a reducing agent to form a first metal, wherein the first metal is to be delivered to the first leach chamber; and a second crystallization chamber to crystallize the second metal ions in the second solution for collection.

2. The apparatus of claim 1, wherein the first metal ions in the first leach chamber are zinc ions and the first crystallization chamber is to form a zinc sulfate hydrate.

3. The apparatus of claim 1, wherein the second metal ions in the first leach chamber are manganese ions and the second crystallization chamber is to form a manganese sulfate hydrate.

4. The apparatus of claim 1, wherein the reducing agent reacted with the second solution is a metal powder.

5. The apparatus according to claim 1, wherein the slurry further comprises ground anode and cathode components from one or more depleted batteries.

6. The apparatus of claim 1, further comprising one or more separators to separate solids from liquids.

7. The apparatus of claim 6, wherein said one or more separators are selected from the group consisting of a gravity trap, a filter, and combinations thereof.

8. A system to provide zinc sulfate and manganese sulfate from batteries, the system comprising:

a grinder to receive the batteries, the grinder to grind the batteries to provide a slurry in a grinding process;

a first leach chamber to treat the slurry with sulfuric acid and oxygen to provide a first liquid and a first solid, wherein the first liquid and the first solid are mixed together in the first leach chamber;

a second leach chamber to receive the first solid from the first leach chamber, wherein the second leach chamber is to treat the first solid with sulfuric acid and sulfur dioxide to provide a second liquid including zinc ions and manganese ions;

a cementation chamber to receive the second liquid from the second leach chamber, wherein the second liquid is to be reacted with a manganese powder to provide zinc metal and a third liquid, wherein the zinc metal is to be transferred to the first leach chamber;

a manganese crystallization chamber to receive the third liquid, wherein the manganese crystallization chamber is to form the manganese sulfate for collection;

a precipitation reactor to receive the first liquid from the first leach chamber, wherein the first liquid is to be reacted with zinc oxide and ozone to form manganese dioxide and a fourth liquid, wherein the manganese dioxide is to be transferred to the second leach chamber for treatment with the first solid; and a zinc crystallization chamber to receive the fourth liquid, wherein the zinc crystallization chamber is to form the zinc sulfate for collection.

9. The system of claim 8, wherein the manganese crystallization chamber forms manganese sulfate heptahydrate, the system further comprising a manganese dehydration reactor to remove waters of hydration from the manganese sulfate heptahydrate.

10. The system of claim 8, wherein the zinc crystallization chamber forms zinc sulfate heptahydrate, the system further comprising a zinc dehydration reactor to remove waters of hydration from the zinc sulfate heptahydrate.

11. The system of claim 8, wherein said grinder further comprises a magnetic separator.

12. The system of claim 8, wherein whole batteries are introduced to the grinder to provide a slurry.

13. The system of claim 12, wherein said batteries are mechanically opened and separated.

14. The system of claim 8, wherein water is added during the grinding process to dissolve potassium hydroxide from the batteries.

15. The system of claim 8, further comprising one or more separators wherein said one or more separators are used to separate solids from liquids in the slurry.

16. The system of claim 15, wherein said one or more separators are selected from the group consisting of a gravity trap, a filter and combinations thereof.

17. The system of claim 8, further comprising a scrubber to remove harmful gas es that are produced from any of the first leach chamber, the second leach chamber, and a dehydration reactor.

* * * * *